United States Patent [19]
Yasumoto et al.

[11] Patent Number: 4,772,985
[45] Date of Patent: Sep. 20, 1988

[54] THICK FILM CAPACITOR

[75] Inventors: Takaaki Yasumoto, Kawasaki; Osamu Furukawa, Sagamihara; Nobuo Iwase, Kamakura; Mitsuo Harata, Kawasaki; Masao Segawa, Fujisawa, all of Japan

[73] Assignee: Kabushiki Kaisha Toshiba, Kawasaki, Japan

[21] Appl. No.: 98,240

[22] Filed: Sep. 18, 1987

[30] Foreign Application Priority Data

Sep. 24, 1986 [JP] Japan ................. 61-225532
Oct. 24, 1986 [JP] Japan ................. 61-253208
Mar. 26, 1987 [JP] Japan ................. 62-72105

[51] Int. Cl.$^4$ .............. C04B 35/46; H01G 4/10; H01G 7/00
[52] U.S. Cl. .................. 361/321; 29/25.42; 264/61
[58] Field of Search ............... 29/25.42; 264/61; 252/62.3 BT, 62.3 ZB; 501/138; 361/321

[56] References Cited

U.S. PATENT DOCUMENTS

| | | | |
|---|---|---|---|
| 3,157,835 | 11/1964 | Cirkler et al. | 361/321 |
| 3,305,394 | 2/1967 | Kaiser et al. | 29/25.42 X |
| 3,591,504 | 7/1971 | Jaffe | 361/321 X |
| 3,600,652 | 8/1971 | Riley | 361/321 |
| 4,392,180 | 7/1983 | Nair | 361/321 |
| 4,625,258 | 11/1986 | Jackson | 264/61 X |

FOREIGN PATENT DOCUMENTS 14665 2/1980 Japan ................. 252/62.3 BT

OTHER PUBLICATIONS

Materials Research Bulletin, vol. 19, pp. 1543-1549, 1984, "A low-Temperatuee Firing Thick Film Capacitor Material Based On Lead Iron Niobate/Tungstate", T. C. Reiley et al.

Primary Examiner—Donald A. Griffin
Attorney, Agent, or Firm—Oblon, Fisher, Spivak, McClelland & Maier

[57] ABSTRACT

Disclosed is a thick film capacitor comprising (a) a sintered layer of a ferroelectric material mainly consisting of one or more ferroelectric inorganic compounds having a perovskite structure and an inorganic binder having a eutectic composition which experiences a liquid phase at a temperature lower than the sintering temperature of the ferroelectric inorganic compounds, and (b) at least two electrodes formed on both surfaces of the sintered layer of the ferroelectric material. In the thick film capacitor of this invention, the perovskite structure of the ferroelectric inorganic compounds is not destroyed upon sintering. Therefore, a high degree of sintering, a good dielectric characteristic and high moisture and migration resistances can be obtained.

15 Claims, 3 Drawing Sheets

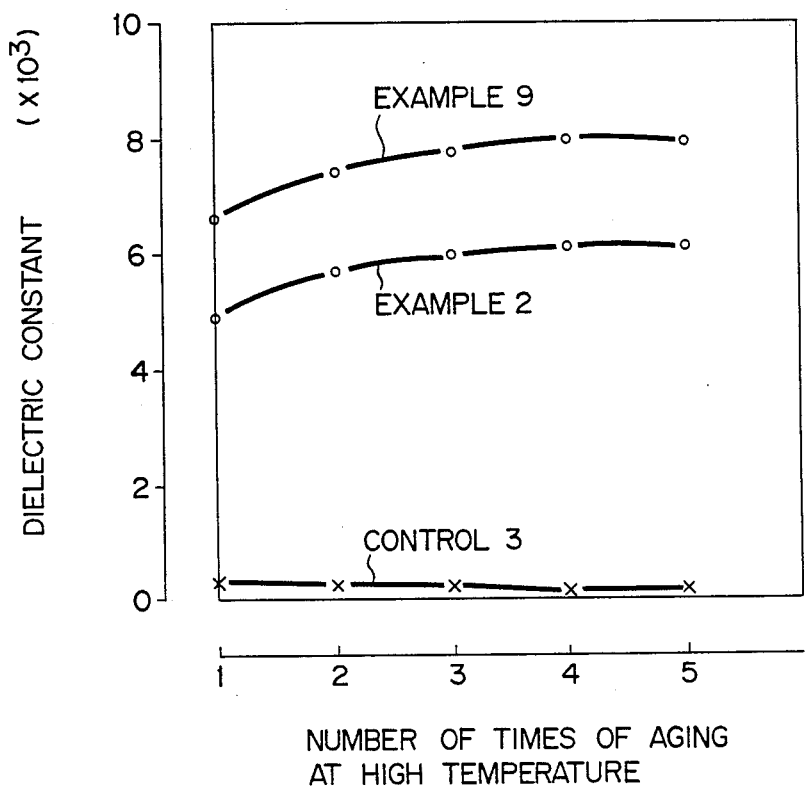
F I G. 4

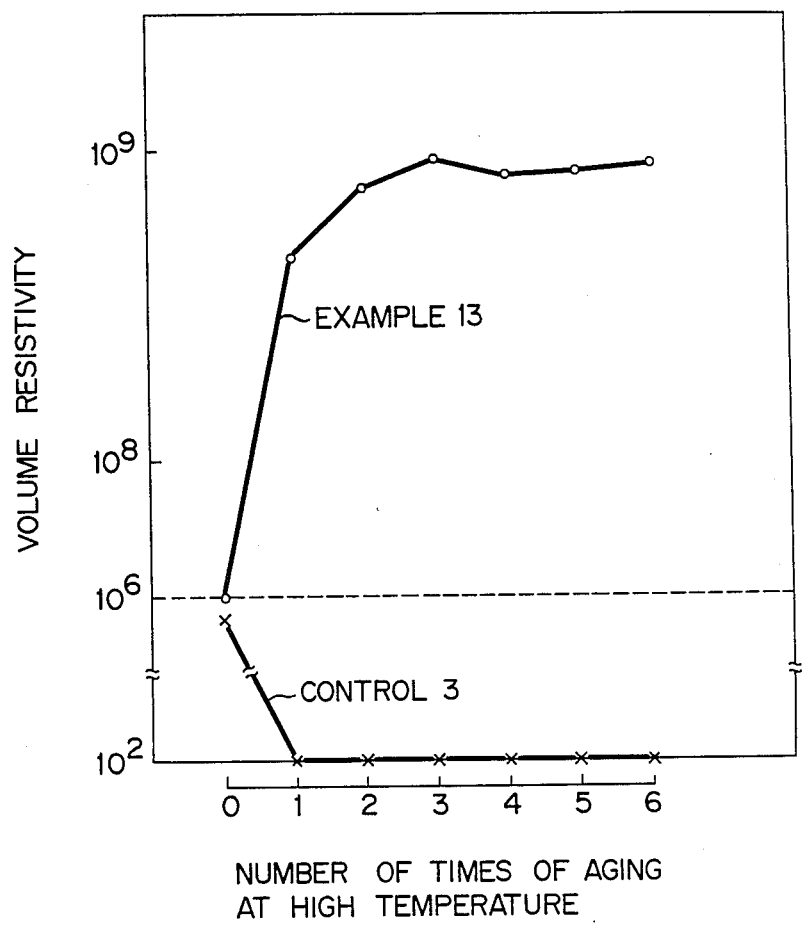
F I G. 5

THICK FILM CAPACITOR

BACKGROUND OF THE INVENTION

1. Field of the Invention

The present invention relates to a thick film capacitor.

2. Description of the Prior Art

A thick film capacitor has a structure wherein a sintered layer of ferroelectric materials is sandwiched between metal electrodes. Ferroelectric compounds used for the thick film capacitor normally have a poor degree of sintering, and it is very difficult to constitute a sintered layer solely by the ferroelectric compounds. For this reason, in the conventional thick film capacitor, a crystalline or amorphous glass is added as a binder to perform sintering, thereby forming the sintered layer of the ferroelectric materials.

However, the addition of glass remarkably degrades the dielectric characteristic of the sintered layer of ferroelectric materials. For example, when a commercially available crystalline or amorphous glass is added to ferroelectric inorganic compounds having a dielectric constant of 20,000 and the mixture is sintered, the dielectric constant of the resultant sintered layer of ferroelectric materials is considerably degraded to 100 to 1000, i.e., a value 1/20 to 1/200 the value before sintering. This is because, upon sintering with a glass additive, the perovskite structure of the ferroelectric inorganic compounds is destroyed.

Since the conventional thick film capacitor contains glass in the sintered layer of ferroelectric materials, it has poor moisture resistance. The conventional capacitor easily causes migration of electrode metals, i.e., has a poor migration resistance.

SUMMARY OF THE INVENTION

It is an object of the present invention to provide a thick film capacitor which has a high degree of sintering, a good dielectric characteristic and a high moisture resistance, and can effectively prevent migration of electrode metals.

In order to achieve the object of the present invention, a thick film capacitor comprises:

(a) a sintered layer of a ferroelectric material mainly consisting of one or more ferroelectric inorganic compounds having a perovskite structure and an inorganic binder having a eutectic composition which experiences a liquid phase at the temperature lower than a sintering temperature of the ferroelectric inorganic compounds; and (b) at least two electrodes formed on both surfaces of the sintered layer of the ferroelectric material.

The inorganic binder contained in the sintered layer of ferroelectric material functions as a binder at a temperature at which the perovskite structure of the respective ferroelectric inorganic compound is not destroyed. For this reason, the ferroelectric compounds in the sintered layer can retain the original perovskite structure. As a result, a high degree of sintering, a good dielectric characteristic and a high moisture resistance can be obtained.

BRIEF DESCRIPTION OF THE DRAWINGS

FIGS. 4 and 5 are graphs for comparing the influences of aging at high temperature between a thick film capacitor according to an embodiment of the present invention and a conventional thick film capacitor.

DETAILED DESCRIPTION OF THE PREFERRED EMBODIMENT

Figure 1:
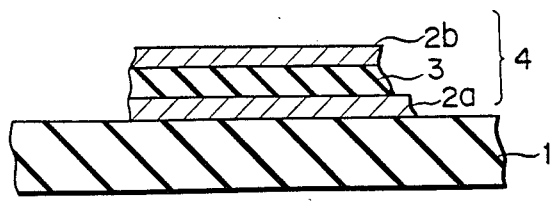
FIG. 1 is a sectional view showing a thick film capacitor according to an embodiment of the present invention.

Examples of ferroelectric inorganic compounds constituting a sintered layer of ferroelectric materials in a thick film capacitor of the present invention include those shown in Table 1. Among these compounds, the following compounds are particularly preferable:

$Pb(Fe_{\frac{1}{2}}Nb_{\frac{1}{2}})O_3\text{-}Ba(Cu_{\frac{1}{2}}W_{\frac{1}{2}})O_3$,
$BaTiO_3$, $PbTiO_3$, and
$(Pb,X)\{(Zn_{\frac{1}{3}}Nb_{\frac{2}{3}})(Mg_{\frac{1}{3}}Nb_{\frac{2}{3}})Ti\}O_3$;
$X = Ba, Ca, Sr, La$.

TABLE 1

| No. | Abbreviation | General Formula |
|---|---|---|
| 1 | PFN | $Pb(Fe_{\frac{1}{2}}Nb_{\frac{1}{2}})O_3$ |
| 2 | BCW | $Ba(Cu_{\frac{1}{2}}W_{\frac{1}{2}})O_3$ |
| 3 | PBZMT | $(Pb_{0.8}Ba_{0.2})(Zn_{\frac{1}{3}}Nb_{\frac{2}{3}})_{0.85}Ti_{0.15}O_3$ |
| 4 | PMZFW | $Pb(Mg_{\frac{1}{3}}Nb_{\frac{2}{3}})_{0.3}(Zn_{\frac{1}{3}}Nb_{\frac{2}{3}})_{0.4}(Fe_{\frac{2}{3}}W_{\frac{1}{3}})_{0.3}O_3$ |
| 5 | PNiWFN | $Pb(Ni_{\frac{1}{2}}W_{\frac{1}{2}})_{0.1}(Fe_{\frac{1}{2}}Nb_{\frac{1}{2}})_{0.9}O_3$ |
| 6 | BTZ | $BaTi_{0.89}Zr_{0.11}O_3$ |
| 7 | PZNFWNi | $Pb(Zn_{\frac{1}{3}}Nb_{\frac{2}{3}})_{0.3}(Fe_{\frac{2}{3}}W_{\frac{1}{3}})_{0.4}(Ni_{\frac{1}{3}}Nb_{\frac{2}{3}})_{0.3}O_3$ |
| 8 | PCoW | $Pb(Co_{\frac{1}{2}}W_{\frac{1}{2}})O_3$ |
| 9 | PNiNFW | $Pb(Ni_{\frac{1}{3}}Nb_{\frac{2}{3}})_{0.1}(Fe_{\frac{1}{2}}Nb_{\frac{1}{2}})_{0.6}(Fe_{\frac{2}{3}}W_{\frac{1}{3}})_{0.3}O_3$ |
| 10 | PT | $PbTiO_3$ |
| 11 | PMN | $Pb(Mg_{\frac{1}{3}}Nb_{\frac{2}{3}})O_3$ |
| 12 | PBMNT | $(Pb_{0.7}Ba_{0.3})(Mg_{\frac{1}{3}}Nb_{\frac{2}{3}}Ti)O_3$ |
| 13 | PZN | $Pb(Zn_{\frac{1}{3}}Nb_{\frac{2}{3}})O_3$ |
| 14 | PCaMNNiW | $(PbCa_{0.03})\{(Mg_{\frac{1}{3}}Nb_{\frac{2}{3}})_{0.7}Ti_{0.2}(Ni_{\frac{1}{2}}W_{\frac{1}{2}})_{0.1}\}O_{3.03}$ |
| 15 | SPT | $Sr_{0.05}Pb_{0.95}TiO_3$ |
| 16 | PMW | $Pb(Mg_{\frac{1}{2}}W_{\frac{1}{2}})O_3$ |
| 17 | PFW | $Pb(Fe_{\frac{2}{3}}W_{\frac{1}{3}})O_3$ |
| 18 | PMnTa | $Pb(Mn_{\frac{1}{3}}Ta_{\frac{2}{3}})O_3$ |
| 19 | PMnN | $Pb(Mn_{\frac{1}{3}}Nb_{\frac{2}{3}})O_3$ |
| 20 | PZr | $PbZrO_3$ |
| 21 | PMnW | $Pb(Mn_{\frac{1}{2}}W_{\frac{1}{2}})O_3$ |
| 22 | PNiN | $Pb(Ni_{\frac{1}{3}}Nb_{\frac{2}{3}})O_3$ |
| 23 | PNiW | $Pb(Ni_{\frac{1}{2}}W_{\frac{1}{2}})O_3$ |
| 24 | PMnSb | $Pb(Mn_{\frac{1}{3}}Sb_{\frac{2}{3}})O_3$ |
| 25 | PCZMT | $(PbCa)\{(Zn_{\frac{1}{3}}Nb_{\frac{2}{3}})_{0.3}(Mg_{\frac{1}{3}}Nb_{\frac{2}{3}})_{0.5}Ti_{0.2}\}O_3$ |

In this invention, examples of inorganic binders included in the sintered layer of ferroelectric materials include the following binary mixtures of oxides:

$PbO\text{-}CuO$, $PbO\text{-}WO_3$, $PbO\text{-}Nb_2O_5$, $PbO\text{-}Fe_2O_3$,
$PbO\text{-}ZnO$, $PbO\text{-}TiO_2$, $PbO\text{-}CaO$, $PbO\text{-}Sb_2O_3$,
$BaO\text{-}WO_3$, $Nb_2O_3\text{-}TiO_2$, $TiO_2\text{-}MgO$, $PbO\text{-}MgO$, and etc.

Note that mixtures containing three or more oxides can be also used. Further, compounds which are converted to the above oxides during sintering, e.g., nitrides, halides, or organometallic compounds, can be used as the inorganic binder in the present invention.

The inorganic binder has a eutectic composition which produces a liquid phase at a temperature lower than the sintering temperature of the ferroelectric inorganic compounds having the perovskite structure, and allows the liquid phase over a wide composition range. Therefore, the inorganic binder can promote the sintering of the ferroelectric inorganic compounds without changing the perovskite structure of the compounds. The inorganic binder of the present invention promotes shrinkage of the ferroelectric inorganic compounds upon sintering to provide a dense composition and to stabilize sintering. For this reason, the sintered layer of ferroelectric materials in the present invention has a good dielectric characteristic equivalent to that of the ferroelectric inorganic compounds itself, and has high moisture and migration resistances.

The inorganic binder consisting of the above mixture can be directly added to the ferroelectric inorganic compounds after the respective components are mixed. The binder can be added after pre-sintering is performed, as needed.

Figure 3:
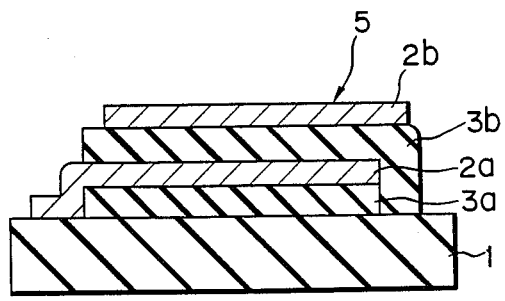
FIG. 3 is a sectional view showing a thick film capacitor according to still another embodiment of the present invention.

A pair of electrodes in the present invention are formed by printing a metal paste selected from the group consisting of, e.g., Au, Ag, Ag-Pd, Pt, Ag-Pt, Cu, Ni, Pd, W, and the like and sintering the paste layer. In the preferred embodiment of the present invention, one (2a) of the pair of electrodes is formed on insulating substrate 1 such as an alumina substrate, and sintered layer 3 of ferroelectric material having the above-mentioned composition and the other electrode 2b are sequentially formed thereon, as shown in FIG. 1. As shown in FIG. 3, sintered layer 3' of ferroelectric materials in which a predetermined amount of the above inorganic binder is added can be interposed between insulating substrate 1 and lower electrode 2a. With this structure, the adhesion strength between electrode 2a and substrate 1 can be improved compared to the structure wherein electrode 2a is directly formed on substrate 1.

A method of manufacturing a thick film capacitor of the present invention will now be illustrated below.

First, ferroelectric inorganic compounds as shown in Table 1 are prepared. For this purpose, raw materials are formulated to prepare a composition corresponding to an respective individual ferroelectric inorganic compound, and thereafter, pre-sintering and the like is performed to synthesize the ferroelectric inorganic compounds. The inorganic compounds need not always include 100% perovskite phase.

Components of an inorganic binder of the present invention are formulated to obtain a predetermined eutectic composition, and the composition is mixed with the above ferroelectric inorganic compounds. At this time, the mixing ratio differs depending on the types of ferroelectric inorganic compounds and inorganic binder, and cannot be uniquely limited. Generally, if the binder amount is too much, the dielectric characteristic of the sintered layer is degraded; otherwise, if the binder amount is too little, a sufficient degree of sintering cannot be obtained. Therefore, the mixing ratio must be set to obtain sintered layer of a ferroelectric materials having a good dielectric characteristic and a high degree of sintering.

The resultant mixture is ground to have a predetermined particle size, and a solvent and an organic binder are added thereto, thereby preparing a ferroelectric paste. If an average particle size of the ground mixture is 1.0 μm or less, it is difficult to grow crystal grains upon sintering, and this causes a decrease in the dielectric constant. If the average particle size exceeds 10 μm, printing of the prepared ferroelectric paste may be disturbed. Therefore, the average particle size should preferably fall within the range of 1.0 to 10 μm. A solvent for preparing the ferroelectric paste can be a normally used solvent such as terpineol, methyl ethyl cellosolve, n-butanol, or the like. The organic binder can be a binder normally used for ceramic molding, such as ethyl-cellulose, methyl-cellulose, polyacryl-resin, polystyrene, polyurethane, polyvinyl alcohol, polyvinyl butyral, nitrocellulose, or the like.

The above-mentioned metal paste and the ferroelectric paste are alternately printed on the insulating substrate, so that a metal paste layer, a ferroelectric paste layer, and another metal paste layer are stacked in this order. Thereafter, the resultant multi-layered structure is sintered. Thus, thick film capacitor 4, wherein metal electrodes 2a and 2b are disposed on and under sintered layer 3 of the ferroelectric materials, can be formed, as shown in FIG. 1. The sintering temperature at this time varies depending upon the metal paste and the ferroelectric paste used. Generally, the sintering temperature falls within a range within which neither swelling nor peeling of other resistors, wirings, and the like occurs. In the above description, the paste layers are sintered at the same time. However, the printing and sintering can be repeated to sequentially form layers 2a, 3, and 2b.

When the thick film capacitor is manufactured by the above method, the inorganic binder is in a liquid phase, and its function as a binder is developed. After sintering, the inorganic binder forms a bonding layer at the grain boundaries of the ferroelectric inorganic compounds, or is diffused in the crystal lattices of the ferroelectric inorganic compounds. However, it has been confirmed that even when the inorganic binder of the present invention is diffused in the crystal lattices of the ferroelectric inorganic compound, it does not destroy the perovskite structure of the ferroelectric compound unlike glass used in a conventional method. As a result, with the above-mentioned method, a thick film capacitor having a high degree of sintering, a good dielectric characteristic, and high moisture and migration resistances can be obtained.

Figure 2:
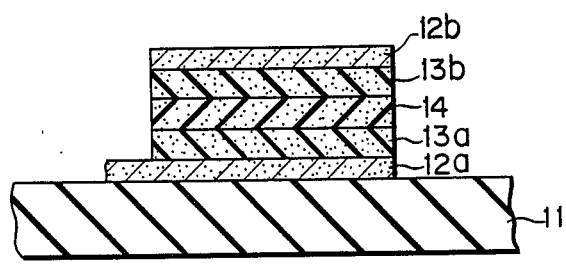
FIG. 2 is a sectional view showing a state before sintering of a thick film capacitor according to another embodiment of the present invention.

Another manufacturing method will now be illustrated. In this embodiment, a second ferroelectric paste having the same composition as that of the above-mentioned ferroelectric paste, except that no inorganic binder is added thereto, is prepared. Using the second ferroelectric paste, the above-mentioned ferroelectric paste, and the metal paste, metal paste layer 12a, ferroelectric paste layer 13a, second ferroelectric paste layer 14, ferroelectric paste layer 13b, and metal paste layer 12b are sequentially printed and stacked, as shown in FIG. 2. When the structure in the state shown in FIG. 2 is sintered, paste layers 12a, 13a, 14, 13b, and 12b are sintered and the inorganic binder contained in layers 13a and 13b is diffused in second ferroelectric paste layer 14. For this reason, although second ferroelectric paste layer 14 does not originally contain the inorganic binder, a good sintered state can be obtained due to diffusion of the inorganic binder during sintering. In addition, since the resultant second sintered layer has a smaller content of the inorganic binder than that of the upper and lower sintered layers, it has a good dielectric characteristic. Therefore, in this embodiment, since the second sintered layer of the ferroelectric materials is included, a thick film condenser having a superior dielectric characteristic to that shown in FIG. 1 can be obtained. In this embodiment, the sintering process may be performed before stacking the next paste layer, so that respective paste layers 12a, 13a, 14, 13b, and 12b are separately sintered.

Still another embodiment will now be described with reference to FIG. 3. In this embodiment, a ferroelectric paste layer, a metal paste layer, a ferroelectric paste layer, and another metal paste layer are sequentially printed and stacked on insulating substrate 1. Then, the resultant structure is sintered, and is cut into desired sizes. Thus, tip capacitor 5, in which sintered layers 3a and 3b of ferroelectric materials and electrodes 2a and 2b are alternately stacked, can be manufactured, as shown in FIG. 3. As has been described above, ferroelectric layer 3a has a function of improving the mechanical bonding strength between insulating substrate 1 and electrode 2a. Note that the tip capacitor shown in FIG. 3 is constituted by two layers of electrodes 2a and 2b, and two ferroelectric layers 3a and 3b. Tip capacitors in which a still lager number of electrodes and ferroelectric layers are stacked can be similarly produced. Electrodes 2a and 2b and ferroelectric layers 3a and 3b may be sequentially printed and sintered in place of simultaneous sintering.

The method of manufacturing the tip capacitor according to the above illustration has the following advantage as compared to a case wherein a tip capacitor is manufactured by the green sheet method. With the green sheet method, a special tool for supporting a multilayered sheet is necessary. However, in the above embodiment, insulating substrate 1 has a support function, and no special tool is required. The number of processes can be reduced. In addition, a thick-film belt-furnace can be used for degreasing and sintering, and production can be completed within a short period of time.

In the manufacturing method of the present invention, aging at high temperature is preferably performed for the resultant sintered product. In the case of this invention, with this aging at high temperature, a dielectric characteristic such as a dielectric constant, a dissipation factor ($\tan\delta 10^{-2}$), a volume resistivity, and the like can be improved. This is quite different from the fact that in a conventional thick film capacitor using a glass binder, the similar aging at high temperature degrades the dielectric characteristics. This is because glass destroys the perovskite structure of the sintered layer of ferroelectric materials during aging at high temperature, while, in the present invention, the above-mentioned inorganic binder does not damage the perovskite structure of the sintered layer of ferroelectric materials but rather promotes its crystal growth. In order to obtain this effect, an upper temperature of aging must be determined so as not to cause voids, swelling, melting, and the like of the ferroelectric layers and electrodes, and a lower temperature limit must be determined to enable the inorganic binder components to diffuse sufficiently into the ferroelectric compounds.

Examples of the present invention will be explained hereinafter.

EXAMPLES 1-16

<A> Synthesis of Ferroelectric Inorganic Compounds

As starting materials, PbO, Fe$_2$O$_3$, WO$_3$, Nb$_2$O$_5$, BaCO$_3$, CuO, MgCO$_3$, and NiO were used and were formulated to obtain compositions corresponding to ferroelectric compounds PFN and BCW shown in Table 1. The PFN and BCW formulas, and NiO, MgO, and MnO as additives were formulated at molar ratios shown in Table 2. In this formulation, mixing ratios of PFN and BCW were adjusted so that x and y in the following formula satisfy $x+y=1$:

$$x(PFN)-y(BCW)$$

Subsequently, the formulated raw materials were wet-mixed by a ball mill, and the mixtures were pre-sintered at a temperature of 700° to 800° C. Furthermore, the resultant sintered structures were ground and dried, thereby preparing ferroelectric inorganic compounds.

<B> Preparation of Inorganic Binder

As raw materials, PbO, CuO, and WO$_3$ were used, and were weighed to obtain molar ratios shown in Table 2. These materials were wet-mixed by a ball mill and dried, thereby obtaining eutectic compositions PbO-CuO and PbO-WO$_3$. The eutectic compositions were pre-sintered at a temperature of 600° to 830° C. Thereafter, the pre-sintered compositions were ground by a ball mill and were dried and used as inorganic binders.

<C> Preparation of Ferroelectric Paste

The ferroelectric inorganic compounds and inorganic binders prepared in processes <A> and <B> were formulated at ratios shown in Table 2. 28% by weight of terpineol as a solvent and 4% by weight of ethyl-cellulose as an organic binder were added to 68% by weight of each formula and were mixed, thus preparing 16 types of ferroelectric pastes.

<D> Manufacture of Thick Film Capacitor

Thick film capacitors as shown in FIG. 1 were produced using the ferroelectric pastes as follows. An Ag-Pb-based metal paste was printed on a 2"×2" alumina substrate, and the above ferroelectric pastes were printed and stacked thereon. Furthermore, another Ag-Pb-based metal paste was printed and stacked on the ferroelectric paste layer of the structure, and thereafter, the resultant structure was sintered at 900° C. for 10 minutes using a belt oven.

The dielectric constant and dissipation factor ($\tan\delta \times 10^{-2}$) at 1 kHz of the resultant thick film capacitors were measured. The results shown in Table 2 were obtained.

Note that for the sake of comparison, conventional thick film capacitors using glass as an inorganic binder were manufactured following the same procedures as above (Controls 1 to 5). Table 2 also shows data associated with these Controls.

TABLE 2

| | Material Composition (Molar Ratio) | | | | | | | | | |
|---|---|---|---|---|---|---|---|---|---|---|
| | (A) Ferroelectric Inorganic Compound | | | | | (B) Inorganic Binder | | | Ratio of (A) and (B) | |
| | (PFN) | (BCW) | MgO | MnO | NiO | PbO | CuO | WO$_3$ | A | B |
| Example | | | | | | | | | | |
| 1 | 0.94 | 0.06 | 0.005 | 0.005 | 0.0025 | 0.9 | 0.1 | — | 0.8711 | 0.1289 |
| 2 | " | " | " | " | " | " | " | — | " | " |
| 3 | " | " | " | " | " | 0.7 | 0.3 | — | 0.8536 | 0.1464 |
| 4 | " | " | " | " | " | " | " | — | " | " |
| 5 | 1.0 | 0 | " | " | " | 0.9 | 0.1 | — | 0.8708 | 0.1292 |

TABLE 2-continued

| | | | | | | | | | |
|---|---|---|---|---|---|---|---|---|---|
| 6 | " | " | " | " | " | " | " | — | " | " |
| 7 | " | " | " | " | " | 0.7 | 0.3 | — | 0.8531 | 0.1469 |
| 8 | " | " | " | " | " | " | " | — | " | " |
| 9 | 0.95 | 0.05 | " | " | " | 0.9 | 0.1 | — | 0.8711 | 0.1289 |
| 10 | " | " | " | " | " | " | " | — | " | " |
| 11 | " | " | " | " | " | 0.7 | 0.3 | — | 0.8535 | 0.1465 |
| 12 | " | " | " | " | " | 0.7692 | — | 0.2308 | 0.9395 | 0.0605 |
| 13 | " | " | " | " | " | 0.8 | 0.2 | — | 0.8628 | 0.1372 |
| 14 | " | " | " | " | " | 0.8569 | — | 0.1431 | 0.8790 | 0.1210 |
| 15 | " | " | " | " | " | " | — | " | " | " |
| 16 | " | " | " | " | " | 0.7692 | — | 0.2303 | 0.9395 | 0.0605 |
| Control | | | | | | | | | | |
| 1 | 0.94 | 0.06 | 0.005 | 0.005 | 0.0025 | PbO—CaO—$B_2O_3$—$SiO_2$ glass | | | 0.93 | 0.07 |
| 2 | " | " | " | " | " | " | | | 0.95 | 0.05 |
| 3 | " | " | " | " | " | " | | | 0.97 | 0.03 |
| 4 | " | " | " | " | " | PbO—CaO—$SiO_2$ glass | | | 0.75 | 0.25 |
| 5 | " | " | " | " | " | " | | | 0.85 | 0.15 |

| | Material Preparation | | | | Characteristics of Thick Film Capacitor | |
|---|---|---|---|---|---|---|
| | Pre-Sintering Temperature of (A) °C. | Presence/Absence of Pre-Sintering of (B) | | Pre-Sintering Temperature of (B) °C. | Dielectric Constant | tan δ ($\times 10^{-2}$) |
| | | Mixing Only | Pre-Sintering | | | |
| Example | | | | | | |
| 1 | 800 | o | — | — | 5000 | 2.02 |
| 2 | " | — | o | 810 | 5000 | 1.99 |
| 3 | " | o | — | — | 5500 | 1.40 |
| 4 | 750 | — | o | 830 | 4300 | 1.10 |
| 5 | 700 | o | — | — | 4000 | 1.05 |
| 6 | 730 | — | o | 830 | 4100 | 1.90 |
| 7 | 770 | o | — | — | 15000 | 0.50 |
| 8 | 800 | — | o | 800 | 4400 | 1.05 |
| 9 | " | o | — | — | 12000 | 0.89 |
| 10 | " | — | o | 800 | 8000 | 0.97 |
| 11 | 780 | o | — | — | 4500 | 1.03 |
| 12 | 800 | o | — | — | 5900 | 0.68 |
| 13 | " | o | — | — | 7000 | 1.13 |
| 14 | 760 | o | — | — | 4100 | 1.09 |
| 15 | 790 | — | o | 650 | 4000 | 1.11 |
| 16 | 800 | — | o | 720 | 5100 | 1.01 |
| Control | | | | | | |
| 1 | 800 | o | — | — | 50 | 5.3 |
| 2 | " | o | — | — | 145 | 6.4 |
| 3 | " | o | — | — | 270 | 4.6 |
| 4 | " | o | — | — | 12.0 | 2.4 |
| 5 | " | o | — | — | 13.0 | 0.83 |

As is apparent from the results shown in Table 2, the conventional thick film capacitors of Controls 1 to 5 have low dielectric constants of 12 to 270, while the thick film capacitors of Examples 1 to 16 can provide very high dielectric constants of 4000 to 15,000.

<Effect of Aging at High Temperature>

Aging at high temperature of 900° C. for 10 minutes was performed 5 times for the thick film capacitors obtained in Examples 2 and 9 and Control 3. Each time the aging process was completed, the dielectric constant was measured, and a change in dielectric constant due to aging at high temperature was examined. The results shown in FIG. 4 were obtained.

Aging at high temperature of 600° C. for 10 minutes was performed 6 times for the thick film capacitors obtained in Example 13 and Control 3. Each time the aging process was completed, the volume resistivity was measured, and a change in volume resistivity due to aging at high temperature was examined. The results shown in FIG. 5 were obtained.

As is apparent from the results shown in FIGS. 4 and 5, in the thick film capacitors of the examples, the dielectric constant can be improved by 10% by aging at high temperature, and the volume resistivity can be increased by 100 times. In contrast to this, in the thick film capacitors of the controls, when aging at high temperature is performed, both the dielectric constant and the volume resistivity are degraded.

In the aging at high temperature, any degradation of the thick film capacitors of the examples was not observed.

EXAMPLES 17-47

<A> Synthesis of Ferroelectric Inorganic Compound

As starting materials, PbO, $Fe_2O_3$, $WO_3$, $Nb_2O_5$, $BaCO_3$, CuO, $MgCO_3$, $MnCO_3$, NiO, $SrCO_3$, $CaCO_3$, $ZrO_2$, $Co_2O_3$, ZnO, $TiO_2$, $Sb_2O_3$, and $Ta_2O_5$ were used, and were formulated to obtain compositions corresponding to ferroelectric compounds shown in Tables 3 and 4. Abbreviations such as PBZMT in Tables 3 and 4 indicate ferroelectric inorganic compounds shown in Table 1. The formulas corresponding to the ferroelectric inorganic compounds and MnO as an additive were formulated at molar ratios shown in Tables 3 and 4. At this time, when a plurality formulas corresponding to ferroelectric inorganic compounds were used, they were used so that a total of their molar ratios was 1.

After the formulated raw materials were wet-mixed by a ball mill and were pre-sintered at a temperature of 700° to 800° C., they were then ground by the ball mill and dried, thus preparing ferroelectric inorganic compounds.

<B> Preparation of Inorganic Binder

PbO, CuO, WO$_3$, Nb$_2$O$_5$, Sb$_2$O$_3$, BaO, Fe$_2$O$_3$, ZnO, and CaO were used as raw materials, and were weighed to obtain molar ratios shown in Tables 3 and 4. The weighed materials were wet-mixed by a ball mill and dried, thereby obtaining eutectic compositions PbO-CuO, PbO-WO$_3$, PbO-Nb$_2$O$_5$, PbO-Sb$_2$O$_3$, PbO-CaO, PbO-Fe$_2$O$_3$, PbO-ZnO, and BaO-WO$_3$. These eutectic compositions were pre-sintered at a temperature of 700° to 830° C. and were ground by a ball mill and dried to prepare inorganic binders.

<C> Preparation of Ferroelectric Paste

The ferroelectric inorganic compounds and inorganic binders prepared in processes <A> and <B> were formulated at ratios shown in Tables 3 and 4. 28% by weight of terpineol as a solvent and 4% by weight of ethyl-cellulose as an organic binder were added to 68% by weight of each formula, and were mixed, thereby preparing 30 types of ferroelectric pastes.

<D> Manufacturing of Thick Film Capacitor

Following the same procedures as in Examples 1 to 16, thick film capacitors as shown in FIG. 1 were manufactured using the above ferroelectric pastes.

However, in Examples 21 and 23, the ferroelectric paste was printed as a buffer layer between the alumina substrate and the metal electrode and was sintered.

The dielectric constant and dissipation factor ($\tan\delta \times 10^{-2}$) at 1 kHz of the resultant thick film capacitors were measured. The results shown in Tables 3 and 4 were obtained.

Note that for the sake of comparison, conventional thick film capacitors using glass as an inorganic binder were manufactured following the same procedures as above (Controls 6 to 10). Tables 3 and 4 also show data associated with these Controls.

TABLE 3

| Example | (A) Ferroelectric Inorganic Compound Abbreviations and Added Amounts | | | | (B) Component of Inorganic Binder | | Ratio of (A) and (B) A | B |
|---|---|---|---|---|---|---|---|---|
| 17 | (PBZMT) 1.0 | — | — | — | PbO 0.94 | Nb$_2$O$_5$ 0.06 | 0.90 | 0.10 |
| 18 | (PBZMT) 1.0 | — | — | — | PbO 0.89 | ZnO 0.11 | 0.93 | 0.07 |
| 19 | (PMN) 0.2 | (PZN) 0.5 | (PT) 0.3 | — | PbO 0.94 | Nb$_2$O$_5$ 0.06 | 0.90 | 0.10 |
| 20 | (PMN) 0.3 | (PZN) 0.7 | — | — | PbO 0.90 | ZnO 0.10 | 0.85 | 0.15 |
| 21 | (PBZMT) 1.0 | — | — | — | PbO 0.94 | Nb$_2$O$_5$ 0.06 | 0.87 | 0.13 |
| 22 | (PMN) 0.5 | (PT) 0.5 | — | — | PbO 0.94 | Nb$_2$O$_5$ 0.06 | 0.82 | 0.18 |
| 23 | (PNiNFW) 1.0 | — | — | MnO 0.005 | PbO 0.94 | Nb$_2$O$_5$ 0.06 | 0.85 | 0.15 |
| 24 | (PNiNFW) 1.0 | — | — | MnO 0.005 | PbO 0.82 | Fe$_2$O$_3$ 0.18 | 0.91 | 0.09 |
| 25 | (PCoW) 0.5 | (PT) 0.5 | — | — | PbO 0.85 | WO$_3$ 0.15 | 0.88 | 0.12 |
| 26 | (PZNFWNi) 1.0 | — | — | — | PbO 0.9 | ZnO 0.1 | 0.80 | 0.20 |
| 27 | (PNiWFN) 0.7 | (BTZ) 0.3 | — | — | PbO 0.85 | WO$_3$ 0.15 | 0.85 | 0.15 |
| 28 | (PMZFW) 1.0 | — | — | MnO 0.01 | PbO 0.85 | WO$_3$ 0.15 | 0.84 | 0.16 |
| 29 | (PFW) 0.7 | (PT) 0.1 | (PZN) 0.2 | — | PbO 0.85 | PbO 0.15 | 0.85 | 0.15 |
| 30 | (PFW) 0.7 | (PT) 0.1 | (PZN) 0.2 | — | PbO 0.94 | Nb$_2$O$_5$ 0.06 | 0.79 | 0.21 |
| 31 | (PFW) 0.8 | (PT) 0.2 | — | — | PbO 0.85 | WO$_3$ 0.15 | 0.86 | 0.14 |
| 32 | (PMnW) 0.6 | (PT) 0.29 | (PNiN) 0.1 | (PMnSb) 0.01 | PbO 0.94 | Nb$_2$O$_5$ 0.06 | 0.83 | 0.17 |
| 33 | (PMnW) 0.6 | (PT) 0.29 | (PNiN) 0.1 | (PMnSb) 0.01 | PbO 0.62 | Sb$_2$O$_3$ 0.38 | 0.87 | 0.13 |
| 34 | (PNiW) 0.5 | (PT) 0.49 | (PMnTa) 0.01 | — | PbO 0.80 | WO$_3$ 0.20 | 0.81 | 0.19 |

| | Material Preparation | | | | | Characteristics of Thick Film Capacitor | |
|---|---|---|---|---|---|---|---|
| Example | Pre-Sintering Temperature of (A) °C. | Presence/Absence of Pre-Sintering of (B) Mixing Only | Pre-Sintering | Pre-Sintering Temperature of (B) °C. | Electrode Material | Dielectric Constant | tan δ (× 10$^{-2}$) |
| 17 | 850 | o | — | — | Pt | 4200 | 1.50 |
| 18 | " | — | o | 750 | Ag | 4500 | 1.05 |
| 19 | " | o | — | — | Pd | 5000 | 2.31 |
| 20 | " | o | — | — | Ni | 4800 | 1.90 |
| 21 | 860 | — | o | 700 | Ag—Pd | 7000 | 1.99 |
| 22 | 870 | o | — | — | Pd | 11000 | 1.86 |
| 23 | 850 | o | — | — | Ag—Pd | 7100 | 2.20 |
| 24 | " | o | — | — | Ag—Pd | 6500 | 4.00 |
| 25 | " | o | — | — | Ag | 5100 | 2.02 |
| 26 | " | — | o | 720 | Ag—Pd | 7500 | 3.15 |
| 27 | 800 | o | — | — | Ag—Pd | 4000 | 2.87 |

TABLE 3-continued

| | | | | | | | |
|---|---|---|---|---|---|---|---|
| 28 | 860 | o | — | — | Ag—Pt | 6000 | 2.50 |
| 29 | 800 | o | — | — | Ag—Pd | 5100 | 2.02 |
| 30 | 850 | — | o | 730 | Ag—Pd | 4800 | 1.89 |
| 31 | 800 | o | — | — | Ag—Pd | 8000 | 2.61 |
| 32 | " | — | o | 730 | Ag—Pd | 4000 | 1.90 |
| 33 | 820 | o | — | — | Ag—Pd | 4000 | 2.30 |
| 34 | 810 | o | — | — | Ag—Pd | 4000 | 2.11 |

TABLE 4

| | Material Composition (Molar Ratio) | | | | | | Ratio of (A) and (B) | |
|---|---|---|---|---|---|---|---|---|
| | (A) Ferroelectric Inorganic Compound Abbreviations and Added Amounts | | | | (B) Component of Inorganic Binder | | A | B |
| Example | | | | | | | | |
| 35 | (PMW) 0.66 | (PT) 0.323 | (PZ) 0.007 | (PMnW) 0.01 | PbO 0.90 | $WO_3$ 0.10 | 0.86 | 0.14 |
| 36 | (PMW) 0.645 | (PT) 0.345 | (PMnTa) 0.01 | — | PbO 0.82 | $WO_3$ 0.18 | 0.88 | 0.12 |
| 37 | (PMW) 0.645 | (PT) 0.345 | (PMnF) 0.01 | — | PbO 0.87 | $WO_3$ 0.13 | 0.89 | 0.11 |
| 38 | (PZN) 0.16 | (PFN) 0.48 | (PFW) 0.36 | MnO 0.01 | PbO 0.85 | $WO_3$ 0.15 | 0.87 | 0.13 |
| 39 | (PZN) 0.16 | (PFN) 0.48 | (PFW) 0.36 | MnO 0.01 | PbO 0.9 | $Nb_2O_3$ 0.1 | 0.88 | 0.12 |
| 40 | (PFN) 0.7 | (PFW) 0.3 | — | MnO 0.01 | PbO 0.9 | $Nb_2O_3$ 0.1 | 0.95 | 0.05 |
| 41 | (PFW) 0.3 | (PFN) 0.69 | (PMnN) 0.01 | MnO 0.01 | PbO 0.91 | $WO_3$ 0.09 | 0.91 | 0.09 |
| 42 | (PFW) 0.3 | (PFN) 0.69 | (PMnTa) 0.01 | MnO 0.01 | PbO 0.85 | $WO_3$ 0.15 | 0.87 | 0.13 |
| 43 | (SPT) 0.4 | (PMW) 0.6 | — | — | PbO 0.84 | $WO_3$ 0.16 | 0.88 | 0.12 |
| 44 | (PCaMNNi) 1.0 | — | — | — | PbO 0.92 | $Nb_2O_5$ 0.08 | 0.86 | 0.14 |
| 45 | (PCaMNNi) 1.0 | — | — | — | PbO 0.85 | CaO 0.15 | 0.87 | 0.13 |
| 46 | (PCaMNNi) 1.0 | — | — | — | PbO 0.85 | $WO_3$ 0.15 | 0.89 | 0.11 |
| 47 | (PCZMT) | — | — | — | PbO 0.96 | ZnO 0.4 | 0.75 | 0.25 |
| Control | | | | | | | | |
| 6 | (PBZMT) 1.0 | — | — | — | PbO—CaO—$SiO_2$ glass | | 0.80 | 0.20 |
| 7 | (PBZMT) 1.0 | — | — | — | $PbO.SiO_2$ glass | | 0.89 | 0.11 |
| 8 | (PBZMT) 1.0 | — | — | — | " | | 0.95 | 0.05 |
| 9 | (PBZMT) 1.0 | — | — | — | PbO—$SiO_2$—BaO—$Bi_2O_3$ glass | | 0.93 | 0.07 |
| 10 | (PCaMN) 1.0 | — | — | — | PbO—CaO—$SiO_2$—$Bi_2O_3$ glass | | 0.94 | 0.06 |

| | Material Preparation | | | | Characteristics of Thick Film Capacitor | |
|---|---|---|---|---|---|---|
| | Pre-Sintering Temperature of (A) °C. | Presence/Absence of Pre-Sintering of (B) Mixing Only / Pre-Sintering | | Pre-Sintering Temperature of (B) °C. | Electrode Material | Dielectric Constant / tan δ ($\times 10^{-2}$) |
| Example | | | | | | |
| 35 | 800 | o | — | — | Ag—Pd | 4500 / 2.70 |
| 36 | " | o | — | — | " | 5000 / 2.67 |
| 37 | " | o | — | — | Ag—Pt | 6200 / 2.96 |
| 38 | " | o | — | — | Ag—Pd | 8000 / 2.55 |
| 39 | " | — | o | 730 | " | 7800 / 2.37 |
| 40 | " | — | o | " | " | 9200 / 1.79 |
| 41 | 830 | o | — | — | " | 8800 / 2.45 |
| 42 | " | o | — | — | " | 8100 / 2.33 |
| 43 | 800 | o | — | — | " | 4800 / 2.81 |
| 44 | 840 | — | o | 730 | Cu | 5600 / 1.41 |
| 45 | " | — | o | " | " | 5900 / 1.22 |
| 46 | " | o | — | — | " | 5500 / 1.31 |
| 47 | 900 | o | — | — | Cu | 5000 / 2.00 |
| Control | | | | | | |
| 6 | 850 | o | — | — | Ag—Pt | 50 / 6.28 |
| 7 | " | o | — | — | " | 550 / 3.50 |
| 8 | " | o | — | — | " | 800 / 3.21 |
| 9 | " | o | — | — | Ag—Pd | 2900 / 3.00 |
| 10 | 900 | o | — | — | " | 700 / 2.45 |

As is apparent from the results shown in Tables 3 and 4, the conventional thick film capacitors of Controls 6

<Compatibility with Printed Resistor>

In Examples 1 to 46 and Controls 1 to 10, a resistor was formed on a single substrate together with the thick film capacitor by the following two methods using a commercially available resistor paste. In the first method, a resistor paste layer was printed and sintered on an insulating paste layer formed on an upper metal paste layer. In the second method, a resistor paste was printed and sintered adjacent to the thick film capacitor to be in contact with the ferroelectric paste layer.

The resultant resistors were checked. In the case of Examples 1 to 46, with either method, a resistor having a desired resistance could be formed. In contrast to this, in the case of Controls 1 to 10, a resistor having a desired resistance could not be formed by either method. This is because in the Controls, glass contained in the ferroelectric paste as a binder was diffused to the resistor paste layer during sintering.

EXAMPLES 48-53

<A> Synthesis of Ferroelectric Inorganic Compounds

PbO, $Fe_2O_3$, $WO_3$, $Nb_2O_5$, $BaCO_3$, and CuO were used as starting materials, and were formulated to obtain compositions corresponding to ferroelectric compounds PFN and BCW shown in Table 1. The PFN and BCW formulas were mixed at molar ratios x:y (x+y=1) shown in Table 5.

Subsequently, the formulated raw materials were wet-mixed by a ball mill, and were pre-sintered at a temperature of 700° to 800° C. The pre-sintered bodies were ground by a ball mill and dried to prepare ferroelectric inorganic compounds.

<B> Preparation of Inorganic Binder

PbO, $WO_3$, CuO, $Fe_2O_3$, $Nb_2O_5$, and BaO were used as raw materials, and were weighed to obtain molar ratios shown in Table 5. The weighed materials were wet-mixed by a ball mill and dried, thus obtaining eutectic compositions PbO-CuO, PbO-$WO_3$, PbO-$Nb_2O_5$, PbO-$Nb_2O_5$-BaO-CuO, PbO-$Nb_2O_5$-$WO_3$, and PbO-$WO_3$-CuO. The eutectic compositions were directly used as inorganic binders. The eutectic compositions were also pre-sintered at a temperature of 600° to 1000° C., ground by a ball mill, and dried to be used as inorganic binders.

<C> Preparation of Ferroelectric Paste

The ferroelectric inorganic compounds and inorganic binders prepared in processes <A> and <B> were formulated at ratios shown in Table 5. 28% by weight of terpineol as a solvent and 4% by weight of ethyl-cellulose as an organic binder were added to 68% by weight of each formula, and were mixed, thereby preparing 6 types of ferroelectric pastes.

28% by weight of terpineol as a solvent and 4% by weight of ethyl-cellulose as an organic binder were added to 68% by weight of the ferroelectric inorganic compound and were mixed, thereby preparing ferroelectric pastes containing no inorganic binder.

<D> Manufacture of Thick Film Capacitor

The ferroelectric pastes containing inorganic binders, the ferroelectric pastes containing no inorganic binders and an Ag-Pb-based metal paste were used to form multi-layered structures shown in FIG. 2 by a print method. The multi-layered structures were sintered at 900° C. for 10 minutes using a belt furnace, thereby producing the thick film capacitors.

The dielectric constant and dissipation factor ($\tan\delta \times 10^{-2}$) at 1 kHz of the resultant thick film condensers were measured. The results shown in Table 5 were obtained.

For the sake of comparison, a conventional thick film capacitor was produced using glass as an inorganic binder and omitting a ferroelectric paste layer (14 in FIG. 2) containing no inorganic binder (Control 11).

A thick film capacitor was produced following the same procedures as in the above examples while omitting a paste layer (14 in FIG. 2) containing no inorganic binder (References 1 and 2).

Table 5 also shows data associated with the control and references.

TABLE 5

| | Material Composition (Molar Ratio) | | | | | Material Preparation | |
|---|---|---|---|---|---|---|---|
| | (A) Ferroelectric Inorganic Compound Abbreviations and Added Amounts | | (B) Component of Inorganic Binder | Ratio of (A) and (B) | | Pre-Sintering Temperature of (A) °C. | Pre-Sintering or Glass Transition Temperature of (B) °C. |
| | PFN | BCW | | A | B | | |
| Example | | | | | | | |
| 48 | 0.94 | 0.06 | PbO:CuO = 0.9:0.1 | 0.8711 | 0.1289 | 800 | No Pre-sintering |
| 49 | " | " | PbO:$WO_3$ = 0.77:0.23 | 0.9395 | 0.0605 | " | " |
| 50 | " | " | PbO:$Nb_2O_5$ = 0.94:0.06 | 0.8900 | 0.1100 | 810 | " |
| 51 | 0.95 | 0.05 | PbO:$Nb_2O_5$:BaO:CuO = 0.88:0.06:0.02:0.04 | 0.91 | 0.90 | 800 | 1000 |
| 52 | " | " | PbO:$Nb_2O_5$:$WO_3$ = 0.90:0.06:0.04 | 0.85 | 0.15 | 790 | Pre-sintering 750 |
| 53 | " | " | PbO:$WO_3$:CuO = 0.90:0.09:0.01 | 0.88 | 0.12 | 800 | No Pre-sintering |
| Control | | | | | | | |
| 11 | 0.94 | 0.06 | PbO—CaO—$B_2O_3$—$SiO_2$ glass | 0.93 | 0.07 | 800 | No Pre-sintering |
| 1 | " | " | PbO:CuO = 0.9:0.1 | 0.89 | 0.11 | " | No Pre-sintering |
| 2 | " | " | " | " | " | " | " |

| Formation Method of Ferroelectric Layer | | | | Characteristics of Thick Film Capacitor | |
|---|---|---|---|---|---|
| Number of Layers of Only (A) Component | Number of Layers of Component Mixture of (A + B) | Ratio of Thickness for A and A + B Layer Formation order | Electrode Material | Dielectric Constant | tan δ (× $10^{-2}$) |

TABLE 5-continued

| Example | | | | | | |
|---|---|---|---|---|---|---|
| 48 | 1 | 2 | A/(A + B) = 1<br>(A + B) · A · (A + B) | Ag—Pd only | 13500 | 0.90 |
| 49 | 1 | 2 | A/(A + B) = 0.5<br>(A + B) · A · (A + B) | " | 15000 | 0.91 |
| 50 | 2 | 1 | A/(A + B) = 1<br>A · (A + B) · A | " | 13000 | 0.85 |
| 51 | 2 | 3 | A/(A + B) = 1.5<br>(A + B) · A ·<br>(A + B) · A · (A + B) | " | 13100 | 1.20 |
| 52 | 1 | 2 | A/(A + B) = 1<br>(A + B) · A · (A + B) | " | 15500 | 0.95 |
| 53 | 2 | 3 | A/(A + B) = 1<br>(A + B) · A ·<br>(A + B) · A · (A + B) | PbO (2 wt %),<br>$WO_3$ (2 wt %)-<br>added Ag—Pb | 15600 | 0.90 |
| Control | | | | | | |
| 11 | 0 | 1 | — | Ag—Pd only | 50 | 3.8 |
| 1 | 0 | 1 | — | " | 8000 | 1.3 |
| 2 | 0 | 1 | — | $PbO—B_2O_3—SiO_2$ glass-<br>added Ag—Pd | 900 | 2.5 |

As is apparent from the results shown in Table 5, the conventional thick film capacitor of Control 11 has a low dielectric constant of 50, while the thick film capacitors of Examples 48 to 53 have extremely high dielectric constants of 13000 or higher. The values of these examples are remarkably larger than dielectric constants of 8000 and 9000 of References 1 and 2. This effect is caused by stacking and sintering ferroelectric pastes (14 in FIG. 2) containing no inorganic binder.

EXAMPLES 54–68

<A> Synthesis of Ferroelectric Inorganic Compound

PbO, $Fe_2O_3$, $WO_3$, $Nb_2O_5$, $BaCO_3$, CuO, $MgCO_3$, and NiO were used as starting materials, and were formulated to obtain compositions corresponding to ferroelectric inorganic compounds PFN and BCW shown in Table 1. The formulas corresponding to the ferroelectric inorganic compounds and NiO, MgO, and MnO as additives were formulated to obtain molar ratios shown in Table 6. In this case, as can be seen from the values in Table 6, x(PFN)—y(BCW) [x+y=1].

After the formulated raw materials were wet-mixed by a ball mill, the materials were pre-sintered at a temperature of 700° to 800° C. and were further ground by a ball mill and dried, thereby preparing ferroelectric inorganic compounds.

<B> Preparation of Inorganic Binder

PbO, CuO, and $WO_3$ as raw materials were weighed to obtain molar ratios shown in Table 6, and were wet-mixed by a ball mill and dried, thus obtaining eutectic compositions PbO-CuO and $PbO-WO_3$. After the eutectic compositions were pre-sintered at a temperature of 600° to 830° C., they were ground by a ball mill and dried to prepare inorganic binders.

<C> Preparation of Ferroelectric Paste

The ferroelectric inorganic compounds and inorganic binders prepared in processes <A> and <B> were formulated at the ratios shown in Table 6. 28% by weight of terpineol as a solvent and 4% by weight of ethylcellulose as an organic binder were added to 68% by weight of each formula and were mixed. As a result, 15 types of ferroelectric pastes were prepared.

<D> Production of Tip Capacitor

An Ag-Pb-based metal paste, the above ferroelectric pastes, and the Ag-Pb-based metal paste were sequentially printed and stacked on a 2"×2" alumina substrate, and the resultant structure was sintered at 900° C. for 10 minutes using a belt oven. Each sintered structure was cut into pieces, thereby manufacturing tip capacitors having the structure shown in FIG. 3.

The dielectric constant and dielectric loss tangent ($\tan\delta \times 10^{-2}$) at 1 kHz of the resultant thick film capacitors were measured. The results shown in Table 6 were obtained.

For the sake of comparison, conventional thick film capacitors were produced using glass as an inorganic binder (Controls 12 to 16). A tip capacitor was manufactured by the green sheet method (Control 17). Table 6 also shows data associated with these controls.

TABLE 6

| | Material Composition (Molar Ratio) | | | | | | | | | |
|---|---|---|---|---|---|---|---|---|---|---|
| | (A) Ferroelectric Inorganic Compound | | | | | (B) Inorganic Binder | | | Ratio of (A) and (B) | |
| | (PFN) | (BCW) | MgO | MnO | NiO | PbO | CuO | $WO_3$ | A | B |
| Example | | | | | | | | | | |
| 54 | 0.94 | 0.06 | 0.005 | 0.005 | 0.0025 | 0.9 | 0.1 | — | 0.8711 | 0.1289 |
| 55 | " | " | " | " | " | " | " | — | " | " |
| 56 | " | " | " | " | " | 0.7 | 0.3 | — | 0.8536 | 0.1464 |
| 57 | " | " | " | " | " | " | " | — | " | " |
| 58 | 1.0 | 0 | " | " | " | 0.9 | 0.1 | — | 0.3708 | 0.1292 |
| 59 | " | " | " | " | " | " | " | — | " | " |
| 60 | " | " | " | " | " | 0.7 | 0.3 | — | 0.8531 | 0.1469 |
| 61 | " | " | " | " | " | " | " | — | " | " |
| 62 | 0.95 | 0.05 | 0.005 | 0.005 | 0.0025 | 0.9 | 0.1 | — | 0.3711 | 0.1289 |
| 63 | " | " | " | " | " | " | " | — | " | " |
| 64 | " | " | " | " | " | 0.7 | 0.3 | — | 0.3535 | 0.1465 |
| 65 | " | " | " | " | " | 0.7692 | — | 0.2308 | 0.9395 | 0.0605 |
| 66 | " | " | " | " | " | 0.8 | 0.2 | — | 0.8628 | 0.1372 |
| 67 | " | " | " | " | " | 0.8569 | — | 0.1431 | 0.8790 | 0.1210 |

TABLE 6-continued

| | | | | | | | | |
|---|---|---|---|---|---|---|---|---|
| 68 Control | " | " | " | " | " | — | " | " |
| 12 | 0.94 | 0.06 | 0.005 | 0.005 | 0.0025 | PbO—CaO—B$_2$O$_3$—SiO$_2$ glass | 0.93 | 0.07 |
| 13 | " | " | " | " | " | " | 0.95 | 0.05 |
| 14 | " | " | " | " | " | " | 0.97 | 0.03 |
| 15 | " | " | " | " | " | PbO—CaO—SiO$_2$ glass | 0.75 | 0.25 |
| 16 | " | " | " | " | " | " | 0.85 | 0.15 |
| 17 | Tip Condenser by Green Sheet Method (Commercial Product) | | | | | | | |

| | Material Preparation | | | | Characteristics of Tip Capacitor | | |
|---|---|---|---|---|---|---|---|
| | Pre-Sintering Temperature of (A) °C. | Presence/Absence of Pre-Sintering of (B) | | Pre-Sintering Temperature of (B) °C. | Dielectric Constant | tan δ (× 10$^{-2}$) | Thickness of Tip Capacitor |
| | | Mixing Only | Pre-Sintering | | | | |
| Example | | | | | | | |
| 54 | 800 | o | — | — | 5000 | 2.02 | 0.35 |
| 55 | " | — | o | 810 | 5000 | 1.99 | 0.25 |
| 56 | " | o | — | — | 5500 | 1.40 | 0.35 |
| 57 | 750 | — | o | 830 | 4300 | 1.10 | 0.35 |
| 58 | 700 | o | — | — | 4000 | 1.05 | 0.35 |
| 59 | 730 | — | o | 830 | 4100 | 1.90 | 0.35 |
| 60 | 770 | o | — | — | 7000 | 2.15 | 0.15 |
| 61 | 800 | — | o | 800 | 4400 | 1.05 | 0.35 |
| 62 | " | o | — | — | 6600 | 0.89 | 0.35 |
| 63 | " | — | o | 800 | 6000 | 0.97 | 0.20 |
| 64 | 780 | o | — | — | 4500 | 1.03 | 0.20 |
| 65 | 800 | o | — | — | 5900 | 0.68 | 0.20 |
| 66 | " | o | — | — | 7000 | 1.13 | 0.20 |
| 67 | 760 | o | — | — | 4100 | 1.09 | 0.20 |
| 68 | 790 | — | o | 650 | 4000 | 1.11 | 0.25 |
| Control | | | | | | | |
| 12 | 800 | o | — | — | 50 | 5.3 | 0.20 |
| 13 | " | o | — | — | 145 | 6.4 | 0.25 |
| 14 | " | o | — | — | 270 | 4.6 | 0.3 |
| 15 | " | o | — | — | 12.0 | 2.4 | 0.3 |
| 16 | " | o | — | — | 13.0 | 0.83 | 0.3 |
| 17 | Tip Condenser by Green Sheet Method (Commercial Product) | | | | 10000 | 1.0 | 0.8 |

As is apparent from the results shown in Table 6, the conventional thick film capacitors of Controls 12 to 16 have low dielectric constants of 12 to 270, while the thick film capacitors of Examples 54 to 68 have extremely high dielectric constants of 4000 to 7000.

The thickness of the tip capacitor of Control 17 is 0.6 to 1.0 mm, while the thickness of the tip capacitors of Examples 54 to 68 is very small, i.e., 0.5 mm or less.

EXAMPLES 69–98

<A> Synthesis of Ferroelectric Inorganic Compound

PbO, Fe$_2$O$_3$, WO$_3$, Nb$_2$O$_5$, BaCO$_3$, CuO, MgCO$_3$, MnCO$_3$, NiO, SrCO$_3$, CaCO$_3$, ZrO$_2$, Co$_2$O$_3$, ZnO, TiO$_2$, Sb$_2$O$_3$, and Ta$_2$O$_5$ were used as starting materials, and were formulated to obtain compositions corresponding to ferroelectric inorganic compounds shown in Tables 7 and 8. Abbreviations such as PBZMT and the like in Tables 7 and 8 indicate ferroelectric inorganic compounds shown in Table 1. The formulas corresponding to the ferroelectric inorganic compounds and MnO as an additive were formulated at the molar ratios shown in Tables 7 and 8. In this case, when a plurality of types of formulas corresponding to the ferroelectric inorganic compounds were used, a total of the molar ratios was 1.

After the formulated raw materials were wet-mixed by a ball mill, they were pre-sintered at a temperature of 700° to 800° C. and ground by a ball mill and dried, thereby preparing ferroelectric inorganic compounds.

<B> Preparation of Inorganic Binder

PbO, CuO, WO$_3$, Nb$_2$O$_5$, Sb$_2$O$_5$, BaO, Fe$_2$O$_3$, ZnO, and CaO as raw materials were weighed to obtain the molar ratios shown in Tables 7 and 8 and were wet-mixed by a ball mill. Thereafter, the mixture was dried. The resultant eutectic compositions PbO-CuO, PbO-WO$_3$, PbO-Nb$_2$O$_5$, PbO-Sb$_2$O$_3$, PbO-CaO, PbO-Fe$_2$O$_3$, PbO-ZnO, and BaO-WO$_3$ were directly used as inorganic binders. After these eutectic compositions were pre-sintered at a temperature of 700° to 830° C., they were ground by a ball mill and dried to be used also as inorganic binders.

<C> Preparation of Ferroelectric Paste

The ferroelectric inorganic compounds and inorganic binders prepared in processes <A> and <B> were formulated at the molar ratios shown in Tables 7 and 8. 28% by weight of terpineol as a solvent and 4% by weight of ethyl-cellulose as an organic binder were added to 68% by weight of each formula and were mixed. As a result, 30 types of ferroelectric pastes were prepared.

<D> Manufacture of Tip Capacitor

Each electrode metal paste shown in Tables 7 and 8, each ferroelectric paste obtained in process <C>, and a metal paste were sequentially printed and stacked on a 2"×2" alumina substrate, and the resultant structure was sintered at 900° C. for 10 minutes using a belt oven. Each sintered structure was cut into pieces, thereby producing tip capacitors having the structure shown in FIG. 3.

The dielectric constant and dissipation factor (tanδ×10$^{-2}$) at 1 kHz of the resultant thick film capacitors were measured. The results shown in Tables 7 and 8 were obtained.

For the sake of comparison, conventional thick film capacitors were produced using glass as an inorganic binder (Controls 18 to 22). Tables 7 and 8 also show data associated with these controls.

TABLE 7

| | Material Composition (Molar Ratio) | | | | | | | |
|---|---|---|---|---|---|---|---|---|
| | (A) Ferroelectric Inorganic Compound Abbreviations and Added Amounts | | | | (B) Component of Inorganic Binder | | Ratio of (A) and (B) | |
| | | | | | | | A | B |
| Example | | | | | | | | |
| 69 | (PBZMT) 1.0 | — | — | — | PbO 0.94 | $Nb_2O_5$ 0.06 | 0.90 | 0.10 |
| 70 | (PBZMT) 1.0 | — | — | — | PbO 0.89 | ZnO 0.11 | 0.93 | 0.07 |
| 71 | (PMN) 0.2 | (PZN) 0.5 | (PT) 0.3 | — | PbO 0.94 | $Nb_2O_5$ 0.06 | 0.90 | 0.10 |
| 72 | (PMN) 0.3 | (PZN) 0.7 | — | — | PbO 0.90 | ZnO 0.10 | 0.85 | 0.15 |
| 73 | (PBZMT) 1.0 | — | — | — | PbO 0.94 | $Nb_2O_5$ 0.62 | 0.87 | 0.13 |
| 74 | (PMN) 0.5 | (PT) 0.5 | — | — | PbO 0.94 | $Nb_2O_5$ 0.62 | 0.82 | 0.18 |
| 75 | (PNiNFW) 1.0 | — | — | MnO 0.005 | PbO 0.94 | $Nb_2O_5$ 0.62 | 0.85 | 0.15 |
| 76 | (PNiNFW) 1.0 | — | — | MnO 0.005 | PbO 0.82 | $Fe_2O_3$ 0.18 | 0.91 | 0.09 |
| 77 | (PCoW) 0.5 | (PT) 0.5 | — | — | PbO 0.85 | $WO_3$ 0.15 | 0.88 | 0.12 |
| 78 | (PZNFWNi) 1.0 | — | — | — | PbO 0.9 | ZnO 0.1 | 0.80 | 0.20 |
| 79 | (PNiWFN) 0.7 | (BTZ) 0.3 | — | — | PbO 0.85 | $WO_3$ 0.15 | 0.85 | 0.15 |
| 80 | (PMZFW) 1.0 | — | — | MnO 0.01 | PbO 0.85 | $WO_3$ 0.15 | 0.84 | 0.16 |
| 81 | (PFW) 0.7 | (PT) 0.1 | (PZN) 0.2 | — | PbO 0.85 | $WO_3$ 0.15 | 0.85 | 0.15 |
| 82 | (PFW) 0.7 | (PT) 0.1 | "— 0.2 | PbO | $Nb_2O_5$ 0.94 | 0.06 | 0.79 | 0.21 |
| 83 | (PFW) 0.8 | (PT) 0.2 | — | — | PbO 0.85 | $WO_3$ 0.15 | 0.86 | 0.14 |
| 84 | (PMnW) 0.6 | (PT) 0.29 | (PNiN) 0.1 | (PMnSb) 0.01 | PbO 0.94 | $Nb_2O_5$ 0.06 | 0.83 | 0.17 |
| 85 | (PMnW) 0.6 | (PT) 0.29 | (PNiN) 0.1 | (PMnSb) 0.01 | PbO 0.62 | $Sb_2O_3$ 0.38 | 0.87 | 0.13 |
| 86 | -(PNiW) 0.5 | (PT) 0.49 | (PMnTa) 0.01 | — | PbO 0.80 | $WO_3$ 0.20 | 0.81 | 0.19 |

| | Material Preparation | | | | | Characteristics of Tip Capacitor | | |
|---|---|---|---|---|---|---|---|---|
| | Pre-Sintering Temperature of (A) °C. | Presence/Absence of Pre-Sintering of (B) | | Pre-Sintering Temperature of (B) °C. | Electrode Material | Dielectric Constant | tan δ ($\times 10^{-2}$) | Thickness of Tip Capacitor |
| Example | | Mixing Only | Pre-Sintering | | | | | |
| 69 | 850 | o | — | — | Pt | 4200 | 1.50 | 0.25 |
| 70 | " | — | o | 750 | Ag | 4500 | 1.05 | 0.26 |
| 71 | " | o | — | — | Pd | 5000 | 2.31 | 0.21 |
| 72 | " | o | — | — | Ni | 4800 | 1.90 | 0.25 |
| 73 | 860 | — | o | 700 | Ag—Pd | 7000 | 1.99 | 0.25 |
| 74 | 870 | o | — | — | Pd | 11000 | 1.86 | 0.25 |
| 75 | 850 | o | — | — | Ag—Pd | 7100 | 2.20 | 0.20 |
| 76 | " | o | — | — | " | 6500 | 4.00 | 0.20 |
| 77 | " | o | — | — | Ag | 5100 | 2.02 | 0.20 |
| 78 | " | — | o | 720 | Ag—Pd | 7500 | 3.15 | 0.20 |
| 79 | 800 | o | — | — | " | 4000 | 2.87 | 0.30 |
| 80 | 860 | o | — | — | Ag—Pt | 6000 | 2.50 | 0.30 |
| 81 | 800 | o | — | — | Ag—Pd | 5100 | 2.02 | 0.21 |
| 82 | 850 | — | o | 730 | " | 4800 | 0.89 | 0.19 |
| 83 | 800 | o | — | — | " | 8000 | 2.61 | 0.19 |
| 84 | " | — | o | 730 | " | 4000 | 1.90 | 0.20 |
| 85 | 820 | o | — | — | " | 4000 | 2.30 | 0.20 |
| 86 | 810 | o | — | — | " | 4000 | 2.11 | 0.20 |

TABLE 8

| | Material Composition (Molar Ratio) | | | | | | | |
|---|---|---|---|---|---|---|---|---|
| | (A) Ferroelectric Inorganic Compound Abbreviations and Added Amounts | | | | (B) Component of Inorganic Binder | | Ratio of (A) and (B) | |
| | | | | | | | A | B |
| Example | | | | | | | | |
| 87 | (PMW) 0.66 | (PT) 0.323 | (PZ) 0.007 | (PMnW) 0.01 | PbO 0.90 | $WO_3$ 0.10 | 0.86 | 0.14 |
| 88 | (PMW) | (PT) | (PMnTa) | — | PbO | $WO_3$ | 0.88 | 0.12 |

TABLE 8-continued

| | | | | | | | | |
|---|---|---|---|---|---|---|---|---|
| | 0.645 | 0.345 | 0.01 | | 0.82 | 0.18 | | |
| 89 | (PMW) | (PT) | (PMnF) | — | PbO | WO$_3$ | 0.89 | 0.11 |
| | 0.645 | 0.345 | 0.01 | | 0.87 | 0.13 | | |
| 90 | (PZN) | (PFN) | (PFW) | MnO | PbO | WO$_3$ | 0.87 | 0.13 |
| | 0.16 | 0.48 | 0.36 | 0.01 | 0.85 | 0.15 | | |
| 91 | (PZN) | (PFN) | (PFW) | MnO | PbO | Nb$_2$O$_3$ | 0.88 | 0.12 |
| | 0.16 | 0.48 | 0.36 | 0.01 | 0.9 | 0.1 | | |
| 92 | (PFN) | (PFW) | — | MnO | PbO | Nb$_2$O$_3$ | 0.95 | 0.05 |
| | 0.7 | 0.3 | | 0.01 | 0.9 | 0.1 | | |
| 93 | (PFW) | (PFN) | (PMnN) | MnO | PbO | WO$_3$ | 0.91 | 0.09 |
| | 0.3 | 0.69 | 0.01 | 0.01 | 0.91 | 0.09 | | |
| 94 | (PFW) | (PFN) | (PMnTa) | MnO | PbO | WO$_3$ | 0.87 | 0.13 |
| | 0.3 | 0.69 | 0.01 | 0.01 | 0.85 | 0.15 | | |
| 95 | (SPT) | (PMW) | — | — | PbO | WO$_3$ | 0.88 | 0.12 |
| | 0.4 | 0.6 | | | 0.84 | 0.16 | | |
| 96 | (PCaMNNi) | — | — | — | PbO | Nb$_2$O$_5$ | 0.86 | 0.14 |
| | 1.0 | | | | 0.92 | 0.08 | | |
| 97 | (PCaMNNi) | — | — | — | PbO | CaO | 0.87 | 0.13 |
| | 1.0 | | | | 0.85 | 0.15 | | |
| 98 | (PCaMNNi) | — | — | — | PbO | WO$_3$ | 0.89 | 0.11 |
| | 1.0 | | | | 0.85 | 0.15 | | |
| Control | | | | | | | | |
| 18 | (PBZMT) | — | — | — | PbO—CaO—SiO$_2$ glass | | 0.80 | 0.20 |
| | 1.0 | | | | | | | |
| 19 | (PBZMT) | — | — | — | PbO.SiO$_2$ glass | | 0.89 | 0.11 |
| | 1.0 | | | | | | | |
| 20 | (PBZMT) | — | — | — | PbO.SiO$_2$ glass | | 0.89 | 0.05 |
| | 1.0 | | | | | | | |
| 21 | (PBZMT) | — | — | — | PbO—SiO$_2$—BaO—Bi$_3$O$_3$ glass | | 0.93 | 0.07 |
| | 1.0 | | | | | | | |
| 22 | (PCaMN) | — | — | — | PbO—CaO—SiO$_2$—Bi$_3$O$_3$ glass | | 0.94 | 0.06 |
| | 1.01 | | | | | | | |

| | Material Preparation | | | | Characteristics of Tip Capacitor | | |
|---|---|---|---|---|---|---|---|
| | Pre-Sintering Temperature of (A) °C. | Presence/Absence of Pre-Sintering of (B) | | Pre-Sintering Temperature of (B) °C. | Electrode Material | Dielectric Constant | tan δ (× 10$^{-2}$) | Thickness of Tip Capacitor |
| | | Mixing Only | Pre-Sintering | | | | | |
| Example | | | | | | | | |
| 87 | 800 | o | — | — | Ag—Pd | 4500 | 2.70 | 0.25 |
| 88 | " | o | — | — | " | 5000 | 2.67 | 0.20 |
| 89 | " | o | — | — | Ag—Pt | 6200 | 2.96 | 0.20 |
| 90 | " | o | — | — | Ag—Pd | 8000 | 2.55 | 0.25 |
| 91 | " | — | o | 730 | " | 7800 | 2.37 | 0.25 |
| 92 | " | — | o | " | " | 9200 | 1.79 | 0.25 |
| 93 | 830 | o | — | — | " | 8800 | 2.45 | 0.25 |
| 94 | " | o | — | — | " | 8100 | 2.33 | 0.25 |
| 95 | 800 | o | — | — | " | 4800 | 2.81 | 0.25 |
| 96 | 840 | — | o | 730 | Cu | 5600 | 1.41 | 0.25 |
| 97 | " | — | o | " | " | 5900 | 1.22 | 0.25 |
| 98 | " | o | — | — | " | 5500 | 1.31 | 0.25 |
| Control | | | | | | | | |
| 18 | 850 | o | — | — | Ag—Pt | 50 | 6.28 | 0.25 |
| 19 | " | o | — | — | " | 550 | 3.50 | 0.25 |
| 20 | " | o | — | — | " | 800 | 3.21 | 0.30 |
| 21 | " | o | — | — | Ag—Pd | 2900 | 3.00 | 0.30 |
| 22 | 900 | o | — | — | " | 700 | 2.45 | 0.30 |

As is apparent from the results shown in Tables 7 and 8, the conventional thick film capacitors of Controls 18 to 22 have low dielectric constants of 50 to 2900, while the thick film capacitors of Examples 69 to 98 have extremely high dielectric constants of 4000 to 11000.

As has been described with reference to Control 17, the thickness of the tip capacitor formed by the green sheet method is 0.6 to 1.0 mm, while the thickness of the tip capacitors of Examples 69 to 98 is very small, i.e., 0.5 mm or less.

As described above, the thick film capacitor of the present invention has a high degree of sintering, a good dielectric characteristic, and high moisture and migration resistances.

In addition, since the thick film capacitor of the present invention is compact and thin, it is advantageous for packaging, and the number of production steps can be reduced.

What is claimed is:

1. A thick film capacitor comprising:
   (a) a sintered layer of a ferroelectric material consisting essentially of at least one ferroelectric inorganic compound having a perovskite structure and an inorganic binder for sintering said at least one ferroelectric inorganic compound without destroying the perovskite structure thereof, said inorganic binder having a eutectic composition which experiences a liquid phase at a temperature lower than the sintering temperature of said at least one ferroelectric inorganic compound; and
   (b) at least one electrode formed on each surface of said sintered layer of the ferroelectric material.

2. A capacitor according to claim 1, wherein said inorganic binder is present at grain boundaries of said ferroelectric inorganic compounds in said sintered layer of the ferroelectric material.

3. A capacitor according to claim 1, wherein said inorganic binder is diffused in crystals of said ferroelectric inorganic compounds in said sintered layer of the ferroelectric material.

4. A capacitor according to claim 1, wherein said inorganic binder is present at grain boundaries and in crystals of said ferroelectric inorganic compounds in said sintered layer of the ferroelectric material.

5. A capacitor according to claim 1, wherein said ferroelectric inorganic compounds are selected from the group consisting of the following compounds:
$Pb(Fe_{\frac{1}{2}}Nb_{\frac{1}{2}})O_3\text{-}Ba(Cu_{\frac{1}{4}}W_{\frac{1}{2}})O_3$,
$BaTiO_3$, $PbTiO_3$, and
$(Pb,Ba)\{(Zn_{\frac{1}{3}}Nb_{\frac{2}{3}})(Mg_{\frac{1}{3}}Nb_{\frac{2}{3}})Ti\}O_3$.

6. A capacitor according to claim 1, wherein said inorganic binder is selected from the group consisting of the following eutectic compositions:
$PbO\text{-}CuO$, $PbO\text{-}WO_3$, $PbO\text{-}Nb_2O_5$, $PbO\text{-}Fe_2O_3$, $PbO\text{-}ZnO$, $PbO\text{-}TiO_2$, $PbO\text{-}CaO$, $PbO\text{-}Sb_2O_3$, $BaO\text{-}WO_3$, $Nb_2O_3\text{-}TiO_2$, $TiO_2\text{-}MgO$, and $PbO\text{-}MgO$.

7. A capacitor according to claim 6, wherein said inorganic binder is selected from the group consisting of compositions which are converted to eutectic compositions by oxidation during sintering.

8. A capacitor according to claim 1, wherein said sintered layer of the ferroelectric material comprises a central layer having a small content of said inorganic binder and layers formed on and under said central layer and having a large content of said inorganic binder.

9. A thick film capacitor comprising:
(a) a first metal electrode layer formed on an insulating substrate;
(b) a sintered layer of a ferroelectric material directly stacked on said first metal electrode layer and consisting essentially of at least one ferroelectric inorganic compound having a perovskite structure and an inorganic binder for sintering said at least one ferroelectric inorganic compound without destroying the perovskite structure thereof, said inorganic binder hving a eutectic composition which experiences a liquid phase at a temperature lower than the sintering temperature of said at least one ferroelectric inorganic compound; and
(c) a second metal electrode layer directly formed on said sintered layer of a ferroelectric material sandwiched between said insulating substrate and said first metal electrode layer.

10. A capacitor according to claim 9, further comprising a sintered layer of a ferroelectric material sandwiched between said insulating substrate and said first metal electrode layer.

11. A thick film capacitor comprising:
(a) a first metal electrode layer formed on an insulating substrate;
(b) a sintered layer of a ferroelectric material directly stacked on said first metal electrode layer and consisting essentially of at least one ferroelectric inorganic compound having a perovskite structure and an inorganic binder for sintering said at least one ferroelectric inorganic compound without destroying the perovskite structure thereof, said inorganic binder having a eutectic composition which experiences a liquid phase at a temperature lower than the sintering temperature of said at least one ferroelectric inorganic compound; and
(c) a second metal electrode layer directly formed on said sintered layer of the ferroelectric material, and wherein
said thick film capacitor is cut into a tip having a desired size.

12. A capacitor according to claim 11, wherein at least one multilayered structure consisting of said sintered layer of the ferroelectric material and said second metal electrode layer is stacked on said second metal electrode layer.

13. A capacitor according to claim 11, further comprising a sintered layer of a ferroelectric material sandwiched between said insulating substrate and said first metal electrode layer.

14. A thick film capacitor manufactured by the process comprising the steps of:
(a) forming a first metal paste layer on an insulating substrate;
(b) stacking on said first metal paste layer a ferroelectric paste layer consisting essentially of at least one ferroelectric inorganic compound having a perovskite structure, an inorganic binder for sintering said at least one ferroelectric inorganic compound without destroying the perovskite structure thereof, said inorganic binder having a eutectic composition which experiences a liquid phase at a temperature lower than the sintering temperature of said ferroelectric compound, at least one organic binder and a solvent;
(c) forming a second metal paste layer directly stacked on said ferroelectric paste layer; and
(d) sintering the laminate formed at steps (a) to (c) at a temperature lower than the sintering temperature of said ferroelectric compound.

15. A thick film capacitor manufactured by the process comprising the steps of:
(a) forming a first metal paste layer on an insulating substrate;
(b) stacking on said first metal paste layer a ferroelectric paste layer consisting essentially of at least one ferroelectric inorganic compound having a perovskite structure, an inorganic binder for sintering said at least one ferroelectric inorganic compound without destroying the perovskite structure thereof, said inorganic binder having a eutectic composition which experiences a liquid phase at a temperature lower than the sintering temperature of said ferroelectric compound, at least one organic binder and a solvent;
(c) forming a second metal paste layer directly stacked on said ferroelectric paste layer;
(d) sintering the laminate formed at steps (a) to (c) at a temperature lower than the sintering temperature of said ferroelectric compound, and
(e) performing aging at high temperatures.

* * * * *